Feb. 21, 1956
J. R. WEBER
2,735,560
SELF-LOADING VEHICLE
Filed May 6, 1954
2 Sheets-Sheet 1
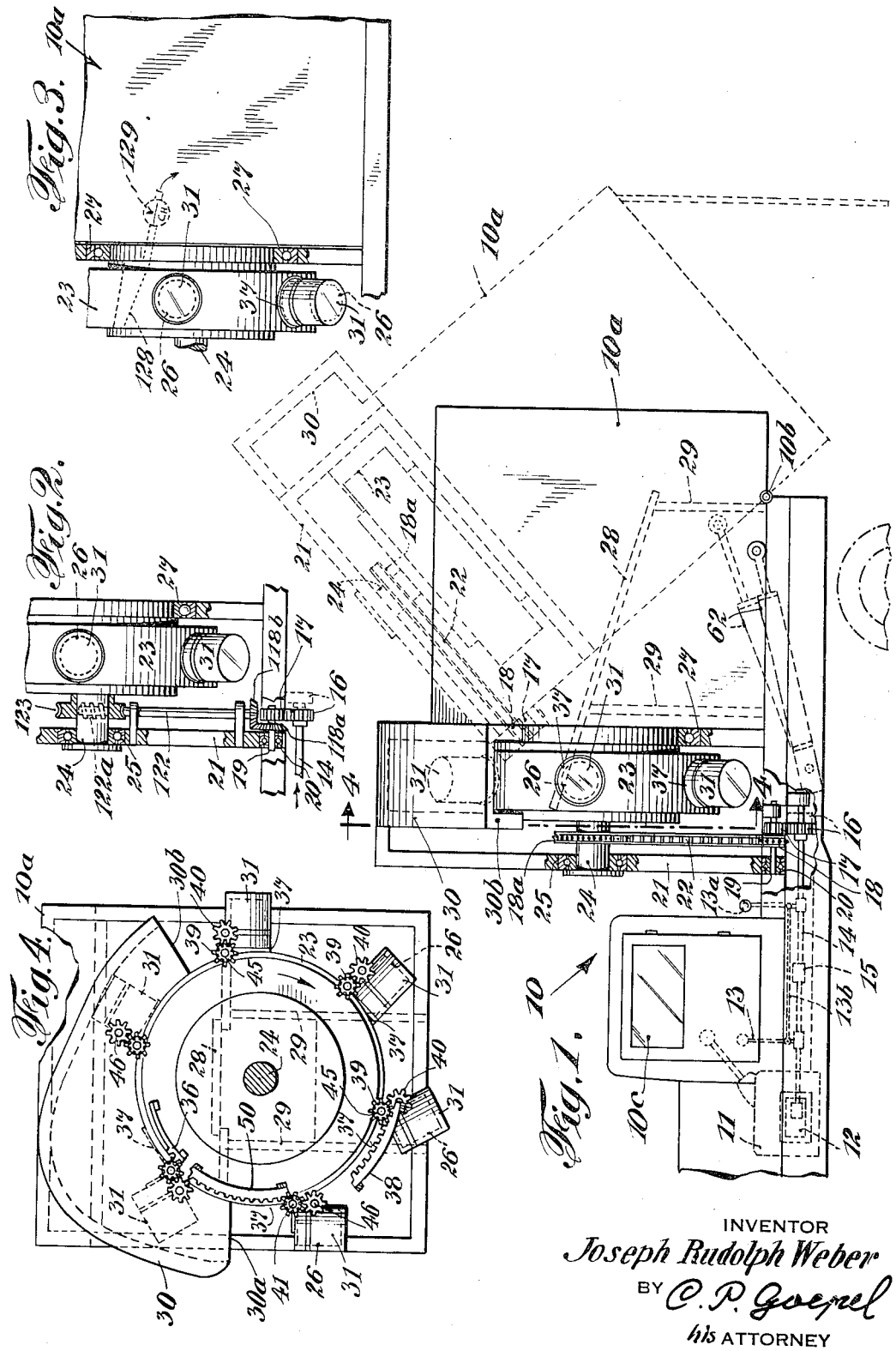
INVENTOR
Joseph Rudolph Weber
BY C. P. Goepel
his ATTORNEY

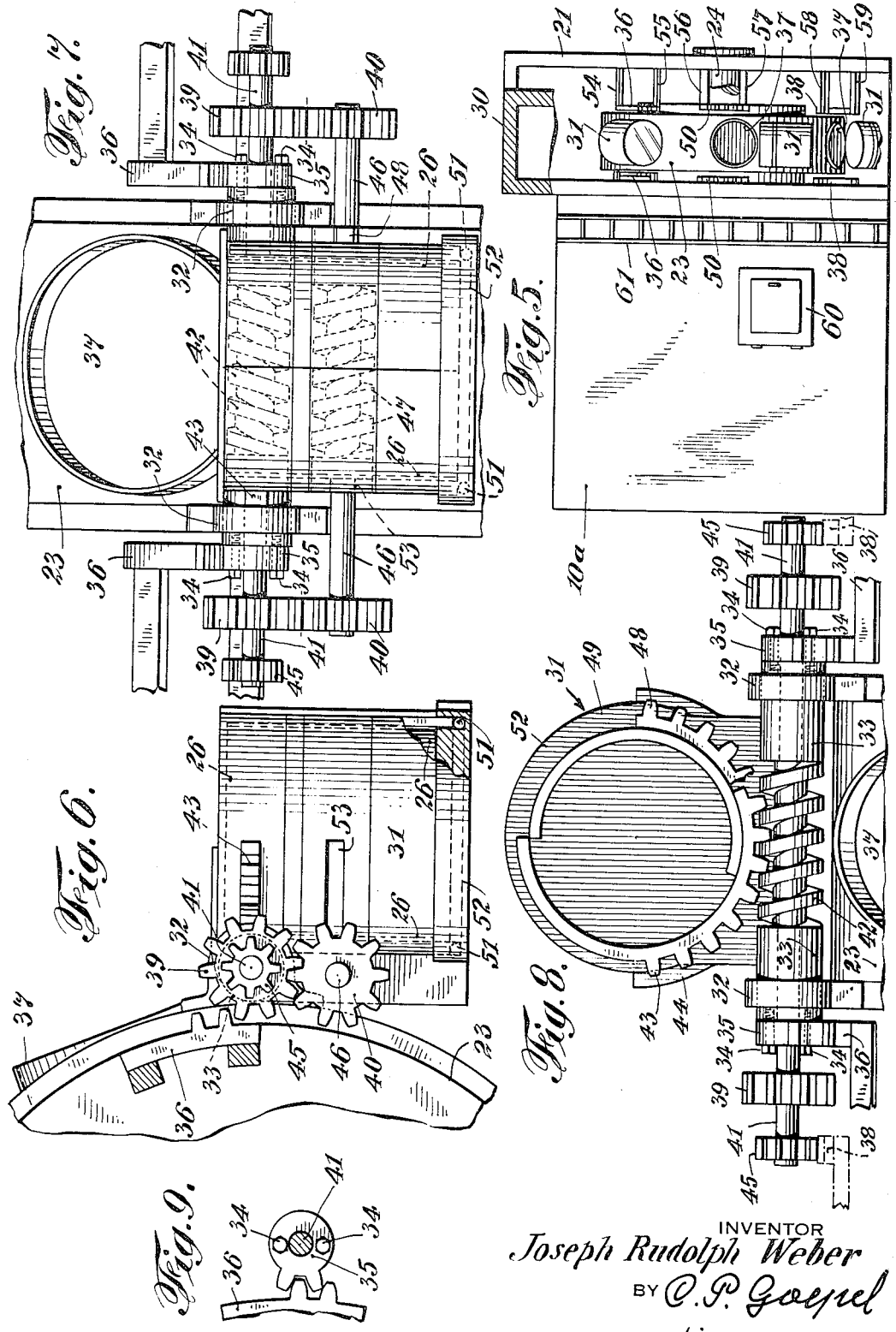

United States Patent Office 2,735,560
Patented Feb. 21, 1956

2,735,560
SELF-LOADING VEHICLE
Joseph Rudolph Weber, New York, N. Y.

Application May 6, 1954, Serial No. 428,100

13 Claims. (Cl. 214—302)

This invention relates to improvements in garbage trucks, and more particularly to a self-loading vehicle of this character.

The improved garbage truck features a rotatable cylindrical flange forming part of and sealing off the receiving end of the tiltable refuse tank. This flange is provided with a plurality of novel cradles including members for reception and cooperating with means for automatic conveying, tilting and release of refuse containing receptacles into the tank. The flange is rotated by the truck engine via suitable gearing which is arranged in a manner to be easily disconnected when the preferably square tank is tilted to discharge the refuse accumulated therein. A duct or tunnel is provided to insure sanitary conditions when the refuse is dumped from the receptacles into the tank.

The improved garbage truck features a novel arrangement for evenly and economically distributing the refuse in the tank in order to increase the capacity thereof. The system may operate in clockwise or counterclockwise direction and the movement of the flange may be intermittent or continuous.

Some at this time preferred embodiments of the improved device will be described in more detail hereinafter in conjunction with the illustrations of the accompanying drawing wherein like characters of reference indicate similar elements, and the invention will be finally pointed out in the appended claims.

In the drawing,

Fig. 1 is a side elevation of the improved refuse collecting truck, with the tank in tilted position indicated in dotted lines;

Fig. 2 is a partial view of the device shown in Fig. 1, illustrating an alternative arrangement of the drive for the rotating flange of the refuse tank;

Fig. 3 illustrates a somewhat different tank for reception of liquids;

Fig. 4 is a section taken on line 4—4 in Fig. 1;

Fig. 5 is a view illustrating the vehicle from the side opposite to that shown in Fig. 1;

Figs. 6 to 8 illustrate in more detail the novel cradles with means for reception, tilting and release of refuse receptacles in an automatic and continuous manner; and Fig. 9 is a detail view of the preferred cradle tilting cam.

Referring now in detail to the illustrated embodiments, and more particularly to Fig. 1, there is shown a garbage truck, generally indicated by numeral 10, carrying a preferably square tank 10a tiltable around a horizontal axis 10b by means of hydraulic jack or jacks 62. The position of tank 10a in tilted state and the corresponding position of a jack 62 are shown in dotted lines.

From the transmission 11 of the truck motor, power is obtained through a suitable power take-off box 12. Control lever 13 in driver's compartment 10c or its companion lever 13a in the rear of the driver's compartment controls the universal joint 15 and drive shaft 14 whose one end is connected to the box 12 and the other end carries a gear 16. Levers 13 and 13a are connected by a rod 13b.

Gear 16 meshes with a gear 17, mounted on shaft 19, rotatable in bearings 20 in frame 21. On tilting of tank 10a, gear 17 is simply lifted above and away from gear 16 and the operative connection interrupted. Shaft 19 also carries a sprocket wheel 18 which drives a chain 22 to rotate the cylinder 23 via a second sprocket wheel 18a on shaft 24, rotatable in bearings 25 and 27 in the frame 21. Fig. 2 shows that shaft 14 is axially oscillatable so as to bring gear 16 into or out of engagement with gear 17 when one or the other of levers 13, 13a is actuated. Cylinder 23 carries a plurality of tiltable cradles 31 with receptacles 26 for dumping of refuse into tank 10a through the adjacent one of openings 37.

To reduce or eliminate slippage, a worm drive, such as shown for example in Fig. 2, is preferred over the chain drive 18, 18a, 22 of Fig. 1. To that end, gear 17 meshes with a horizontal bevel gear 118b at the lower end of vertical shaft 122, the upper end of shaft 122 carrying a worm 122a cooperating with a worm wheel 123 which is non-rotatably mounted on shaft 24 for rotation of the cylinder 23.

A detachable and removable inclined chute 28 projects with its narrow upper end into the interior of the rotatable cylinder 23 and is supported by two or more legs 29 inside of the tank 10a. This chute may be replaced by any known conveyor for transport of materials from higher to lower levels, such as a plurality of spaced rollers or the like.

When the novel garbage disposal system is applied to a liquid tank, the chute 28 is replaced by a funnel 128, as shown in Fig. 3. The funnel 128 has a single tubular outlet at the rear side penetrating the front wall of the tank truck and is equipped with a conventional inlet valve 129.

Fig. 4, which is a vertical section taken on line 4—4 in Fig. 1, shows a dust or splash tunnel 30 extending substantially along the upper half of the periphery of rotating flange or cylinder 23. As will be explained in more detail in connection with Figs. 5 to 9, the novel refuse disposal system operates as follows:

When the rotating gear 16 engages gear 17, the latter in turn rotating shaft 24 with cylinder 23, the cradles 31 travel along the periphery of cylinder 23 and carry refuse receptacles 26 through the entrance 30a of tunnel 30 to be inverted by special so-called overturn cams 35, and the contents of receptacles dumped through an adjacent opening 37 onto the chute 28 inside of the tank 10a. In the embodiment of Figs. 1 to 5, six cradles 31 are shown, and the length of tunnel or duct 30 is so dimensioned that the uppermost cradle 31 is inverted when the next cradle following the clockwise rotation of sleeve or cylinder 23 seals the entrance 30a, while an advanced cradle 31 seals the exit end 30b of the tunnel, to prevent escape of lighter matter and splashing of liquids on dumping of the receptacles 26. Rack 38 engages a gear 45 of the passing cradle to release an empty receptacle 26, while rack 50 acts on the same gear 45 to lock or retain a filled receptacle in the cradle. A third, so-called overturn rack 36, causes the tilting of cradle 31 inside of the duct 30 and the above described procedure is then repeated with the next cradle. The empty receptacles are removed from and filled receptacles are placed onto the platform 52 of a cradle while the cradle travels between the opening rack 38 and closing rack 50. Obviously, the rotation of cylinder 23 may be interrupted while the receptacles are interchanged. Racks 36, 38 and 50 are preferably arranged in pairs to reduce the torque, and are fixedly supported by the frame 21 which is preferably of the inverted U-shape, as seen in Fig. 5.

Referring now to Figs. 6 to 9, brackets 32 are secured to the periphery of rotating cylinder 23 to tiltably support cradles 31. Each cradle is provided with a rounded portion 33 (see Figs. 6 and 8) permitting a pivoting of the cradle for approximately 90°. Toothed cams 35 are rigidly attached to the lateral extensions of member 33 and are secured thereto by bolts 34. When a cradle reaches the fixed overturn racks 36, the teeth of cams 35 will engage the teeth of said racks, causing cradle 31 to pivot from a tangential position with respect to the periphery of the cylinder 23 into a position to cover the adjacent opening 37 and dump the contents of a receptacle 26 onto the chute 28. The contents of the receptacles are dumped partly by gravity and partly due to the sudden rocking of the cradle by the overturn rack 36.

On further unidirectional travel of the sleeve 23, a cradle 31 carrying an empty receptacle 26 first seals the exit end 30b of tunnel 30 and then follows the circular motion of the cylinder 23 to reach the opening racks 38 which engage the teeth of gears 45. Gears 45 are mounted on shaft 41 which supports gears 39, the latter meshing with gears 40 on an adjacent shaft 46. Gears 40, meshing with gears 39, are rotated to cause rotation of shafts 41 and 46 provided with worms 42 and 47, respectively. Worms 42 and 47 engage the teeth 43 and 48 on substantially semicircular cradle arms or aprons 44 and 49, respectively, to cause circular motion of said cradle arms and the release of an empty refuse receptacle 26 placed on the platform 52 of the cradle. Shaft 41 traverses fixed cams 35. The empty receptacle 26 is then removed and a filled receptacle placed into the cradle. On continued rotation of the cylinder 23, cradle 31 reaches the closing racks 50 which are mounted in the path of gears 45 to cause their rotation in the direction opposite to that imparted to said gears by racks 38. The cradle arms or skirts 44 and 49 are then moved in a direction to embrace and hold a filled receptacle placed onto the cradle platform 52 during and after the tilting by racks 36, until the rotating cradle again reaches the opening racks 38.

To simplify the construction of the device, the cradle arms 44 and 49 may be actuated manually by the crew members, and the racks 38, 50, gears 39, 40, 45, worms 42, 47 with teeth 43, 48 on cradle arms omitted. In such case, a closing pin or other type of lock should be provided to lock the cradle arms during the tilting operation in order to securely retain a filled receptacle 26.

Cradle arms 44, 49 slide in circular motion in the cradle platform 52 on suitable rollers or balls 51 in conventional slide door fashion. The arms 44 and 49 have cutouts 53 to permit lateral movement of projecting teeth 43, 48, respectively, meshing with worms 42, 47 on shafts 41, 46.

Overturn racks 36 are secured to frame 23 by retaining members 54, 55 (see Fig. 5) on both sides of the rotating flange 31. Similarly, closing racks 50 are supported by members 56, 57, and the opening racks 38 by members 58, 59.

A hinged door 60 is provided in the tank 10a for insertion of large items, such as empty cartons and the like. A ladder 61 permits access to a manhole in the top of tank 10a (not shown), and a similar ladder may be provided inside of the tank.

Fluid jacks 62 may be operated in any suitable manner to tilt the tank 10a for dumping its contents through a suitable opening in the rear wall thereof (not shown). The hoisting of the tank 10a is controlled by the driver.

While some preferred embodiments of the novel self loading truck have been shown and described, it will be understood that various changes and modifications may occur to men skilled in the art, and I therefore do not desire to be limited to the exact details of the device as shown and described, but only by the scope of the appended claims.

I claim:

1. In a self loading dump truck having an engine, a chassis, a tank for reception of refuse in solid and liquid form with a front end and a rear end, said tank being tiltably supported on said chassis, and a device for tilting said tank around an axis in the proximity of said rear end thereof, in combination: an automatic system for reception and dumping of refuse from containers into said tank, including a rotatable closure member at said front end of said tank, said closure member having a substantially cylindrical portion, an operative connection between said engine and said closure member for unidirectionally rotating said cylindrical portion, means for controlling the rotation of said cylindrical portion, said cylindrical portion having a plurality of radially disposed openings, a cradle tiltably supported in the proximity of each of said openings, each of said cradles having a platform and arms for retaining and releasing a refuse container placed onto said platform on continued unidirectional rotation of said closure member, and means for actuating said arms and for tilting said cradles, whereby containers placed on said platforms of each of said cradles are tilted over an adjacent one of said openings in said cylindrical portion on continuous unidirectional rotation thereof.

2. In a self loading dump truck having an engine, a chassis, a tank for reception of refuse in solid and liquid form with a front end and a rear end, said tank being tiltably supported on said chassis, and a device for tilting said tank around an axis in the proximity of said rear end thereof, in combination: an automatic system for reception and dumping of refuse from containers into said tank, including a rotatable closure member at said front end of said tank, said closure member having a substantially cylindrical portion, an operative connection between said engine and said closure member for unidirectionally rotating said cylindrical portion, means for controlling the rotation of said cylindrical portion, said cylindrical portion having a plurality of radially disposed openings, a cradle tiltably supported in the proximity of each of said openings, each of said cradles having a platform and arms for retaining and releasing a refuse container placed onto said platform, means for actuating said arms and for tilting said cradles, and a duct at said front end of said tank, said duct having an entry aperture and an exit aperture for passage of said cradles therethrough and extending along the periphery of said cylindrical portion of said closure member in the proximity of said means for tilting said cradles, whereby containers placed on said platforms of each of said cradles are tilted over an adjacent one of said openings in said cylindrical portion on continued unidirectional rotation thereof and while said containers are in said duct.

3. The structure recited in claim 2, wherein the length of said duct corresponds substantially to the distance between a pair of cradles attached to said cylindrical portion of said closure member with a tilted cradle therebetween, and said apertures having a contour corresponding to the contours of said cradles whereby one of said cradles, upon tilting thereof, is adapted to close said exit aperture of said duct while an adjacent one of said cradles is being tilted and a subsequent one of said cradles closes the entry aperture of said duct.

4. In a self loading dump truck having an engine, a chassis, a tank for reception of refuse in solid and liquid form with a front end and a rear end, said tank being tiltably supported on said chassis, and a device for tilting said tank around an axis in the proximity of said rear end thereof, in combination: an automatic system for reception and dumping of refuse from containers into said tank, including a rotatable closure member at said front end of said tank, said closure member having a substantially cylindrical portion, an operative connection between said engine and said closure member for unidirectionally rotating said cylindrical portion, means for controlling the rotation of said cylindrical portion, said cylindrical portion having a plurality of radially disposed openings, a cradle tiltably supported in the proximity of each of said openings, each of said cradles having a platform and arms for retaining and releasing a refuse container placed onto said platform, means for actuating said arms and for tilting said cradles, and a chute in said tank, said chute extending into said cylindrical portion of said closure member at said front end of said tank and gradually flaring toward said rear end thereof, said chute being downwardly inclined from said front end thereof toward said rear end of said tank, whereby containers placed on said platforms of each of said cradles are tilted over an adjacent one of said openings and onto said chute in said cylindrical portion on continued unidirectional rotation thereof.

5. As a novel structure in an automatic system for receiving and dumping refuse from containers into the tank of a self loading dump truck, a cradle consisting of a substantially horizontal platform, a substantially vertical support, said support having an at least partially rounded upper end with a pair of toothed cams at both lateral extremities of said upper end, a pair of arcuate arms laterally projectible from and retractable into said vertical support, said arms being in substantially parallel spaced relationship and each including a toothed portion, a pair of worms, one of said worms meshing with said toothed portion of one of said arms and the other of said worms meshing with said toothed portion of the other of said arms, and gears connected with said worms for rotation thereof whereby to retract said arms into said vertical support of said cradle or to project said arms therefrom, said arms, on projection thereof from said vertical support, being adapted to circumferentially engage and retain a container placed on said platform of said cradle.

6. In a self loading dump truck having an engine, a chassis, a tank for reception of refuse in solid and liquid form with a front end and a rear end, said tank being tiltably supported on said chassis, and a device for tilting said tank around an axis in the proximity of said rear end thereof, in combination: an automatic system for reception and dumping of refuse from containers into said tank, including a rotatable closure member at said front end of said tank, said closure member having a substantially cylindrical portion, a frame attached to said front end of said tank, a shaft supported in said frame for supporting said closure member, an operative connection between said engine and said shaft for unidirectional rotation of said closure member with said cylindrical portion, means for controlling the rotation of said shaft, said cylindrical portion having a plurality of radially disposed openings, a cradle tiltably supported on said cylindrical portion of said closure member in the proximity of each of said openings, each of said cradles having a platform and arms for circumferentially retaining and releasing a refuse container placed onto said platform, and means for actuating said arms and for automatically tilting said cradles on unidirectional rotation of said closure member, whereby containers on said platforms of each of said cradles are tilted over an adjacent one of said openings in said cylindrical portion on continuous rotation thereof.

7. In a self loading dump truck having an engine, a chassis, a tank for reception of refuse with a front end and a rear end, said tank being tiltably supported on said chassis, and a device for tilting said tank around an axis in the proximity of said rear end thereof, in combination: an automatic system for reception and dumping of refuse from containers into said tank, including a rotatable closure member at said front end of said tank, said closure member having a substantially cylindrical portion, a frame of inverted U-shape attached to said front end of said tank, a shaft supported in said frame for supporting said closure member with said cylindrical portion thereof between the legs of said frame, an operative connection between said engine and said shaft for unidirectional rotation of said closure member, means for controlling the rotation of said shaft, said cylindrical portion having a plurality of radially disposed openings, a cradle tiltably supported on said cylindrical portion in the proximity of each of said openings, each of said cradles having a platform and arms for retaining and releasing a refuse container placed onto said platform, and means for actuating said arms and for automatically tilting said cradles on unidirectional rotation of said closure member, whereby containers on said platforms of each of said cradles are tilted over an adjacent one of said openings in said cylindrical portion of said closure member on continuous rotation thereof.

8. In a self loading dump truck having an engine, a chassis, a refuse tank with a front end and a rear end, said tank being tiltably supported on said chassis, and a device for tilting said tank around an axis in the proximity of said rear end thereof, in combination: an automatic system for reception and dumping of refuse containers into said tank, including a rotatable closure member at said front end of said tank, said closure member having a substantially cylindrical portion, a frame attached to said front end of said tank, a first shaft supported in said frame for supporting said closure member, an operative connection between said engine and said first shaft for rotating said closure member with said cylindrical portion, said operative connection including a second shaft driven by said engine at one extremity thereof, a first gear at the other extremity of said second shaft, a third shaft in said frame, a second gear on said third shaft meshing with said first gear, a first sprocket on said third shaft, a second sprocket on said first shaft and a chain over said sprockets, said cylindrical portion of said closure member having a plurality of radially disposed openings, a cradle tiltably supported on said cylindrical portion in the proximity of each of said openings, each of said cradles having a platform and arms for retaining and releasing a refuse container placed onto said platform, means for actuating said arms and for tilting said cradles, and means for controlling the rotation of said second shaft including a clutch member and at least one control member for actuating of said clutch member, whereby containers on said platforms on each of said cradles are tilted over an adjacent one of said openings in said cylindrical portion of said closure member on continuous rotation thereof.

9. In a self loading dump truck having an engine, a chassis, a refuse tank with a front end and a rear end, said tank being tiltably supported on said chassis, and a device for tilting said tank around an axis in the proximity of said rear end thereof, in combination: an automatic system for reception and tilting of refuse containers into said tank, including a rotatable closure member at said front end of said tank, said closure member having a substantially cylindrical portion, a frame attached to said front end of said tank, a first shaft supported in said frame for supporting said closure member, an operative connection between said engine and said first shaft for rotating said closure member with said cylindrical portion, said operative connection including a second shaft driven by said engine at one extremity thereof, a first gear at the other extremity of said second shaft, a third shaft in said frame, a second gear on said third shaft meshing with said first gear on said second shaft, a worm meshing with said second gear and a third gear on said first shaft meshing with said worm, means for controlling the rotation of said second shaft including a clutch member and at least one control member for actuating said clutch member, said cylindrical portion of said closure member having a plurality of radially disposed openings, a cradle tiltably supported on said cylindrical portion in the proximity of each of said openings, each of said cradles having a platform and arms for retaining and releasing a refuse container placed onto said platform, and means for actuating said arms and for tilting said cradles whereby containers placed onto said platforms of each of said cradles and retained by said arms are tilted over an adjacent one of said openings in said cylindrical portion on continuous rotation thereof.

10. In a self loading dump truck having an engine, a chassis, a refuse tank with a front end and a rear end, said tank being tiltably supported on said chassis, and a device for tilting said tank around an axis in the proximity of said rear end thereof, in combination: an automatic system for reception and dumping of refuse containers into said tank, including a rotatable closure member at said front end of said tank, said closure member having a substantially cylindrical portion, a frame attached to said front end of said tank, a shaft supported in said frame for supporting said closure member, an operative connection between said engine and said shaft for rotating said closure member with said cylindrical portion thereof, means for controlling the rotation of said shaft, said cylindrical portion having a plurality of radially disposed openings, a cradle tiltably supported on said cylindrical portion in the proximity of each of said openings, each of said cradles having a platform and arms for selectively retaining and releasing a refuse container placed onto said platform, and rack means attached to said frame in the path of said cradles while said cradles rotate with said cylindrical portion of said closure member and being adapted to actuate said arms and tilt said cradles, whereby containers with refuse placed onto said platforms of each of said cradles are tilted over an adjacent one of said openings in said cylindrical portion of said closure member on continuous rotation thereof.

11. In a self loading dump truck having an engine, a chassis, a refuse tank with a front end and a rear end, said tank being tiltably supported on said chassis, and a device for tilting said tank around an axis in the proximity of said rear end thereof, in combination: an automatic system for reception and dumping of refuse containers into said tank, including a rotatable closure member at said front end of said tank, said closure member having a substantially cylindrical portion, a frame attached to said front end of said tank, a shaft supported in said frame for supporting said closure member, an operative connection between said engine and said shaft for rotation of said closure member with said cylindrical portion thereof, means for controlling the rotation of said shaft, said cylindrical portion having a plurality of radially disposed openings, a cradle tiltably supported on said cylindrical portion in the proximity of each of said openings, each of said cradles having a platform and arms for selectively retaining and releasing a refuse container placed onto said platform, and rack means attached to said frame in the path of said cradles, including a first rack for actuating said arms to retain a container placed onto said platform of each of said cradles, a second rack for actuating said arms to release a container placed onto said platform of one of said cradles, and a third rack for tilting said cradles, whereby refuse containers placed onto said platforms of said cradles are tilted over an adjacent one of said openings in said cylindrical portion of said closure member on continuous rotation thereof.

12. In a self loading dump truck having an engine, a chassis, a refuse tank with a front end and a rear end, said tank being tiltably supported on said chassis, and a device for tilting said tank around an axis in the proximity of said rear end thereof, in combination: an automatic system for continuously receiving, dumping and releasing refuse containers, including a rotatable closure member at said front end of said tank, said closure member having a substantially cylindrical portion, a frame attached to said front end of said tank, a shaft supported in said frame for supporting said closure member, an operative connection between said engine and said shaft for rotation of said closure member with said cylindrical portion thereof, means for controlling the rotation of said shaft, said cylindrical portion having a plurality of radially disposed openings, a cradle tiltably supported in the proximity of each of said openings on said cylindrical portion, each of said cradles having a platform and arms for selectively retaining and releasing a refuse container placed onto said platform, rack means attached to said frame in the path of said cradles, including a first rack for actuating said arms to retain a refuse container placed onto said platform of one of said cradles, a second rack for actuating said arms to release a refuse container placed onto said platform of one of said cradles, and a third rack for tilting said cradles with said containers, each of said cradles further including gears for meshing with said first and said second rack and toothed cams for meshing with said third rack, and said racks being spaced on said frame for actuating said arms and for tilting said cradles at predetermined intervals on rotation of said cylindrical portion, whereby refuse containers placed onto said platforms of said cradles and retained by said arms are tilted over an adjacent one of said openings in said cylindrical portion of said closure member on continuous rotation thereof.

13. In a self loading dump truck having an engine, a chassis, a refuse tank with a front end and a rear end, said tank being tiltably supported on said chassis, and a device for tilting said tank around an axis in the proximity of said rear end thereof, in combination: an automatic system for reception and dumping of refuse containers into said tank, including a rotatable closure member at said front end of said tank, said closure member having a substantially cylindrical portion, an operative connection between said engine and said closure member for rotation of said closure member with said cylindrical portion, means for controlling the rotation of said closure member, said cylindrical portion having six radially spaced openings, a cradle tiltably supported on said cylindrical portion in the proximity of each of said openings, each of said cradles having a platform and a pair of arms for selectively retaining and releasing a refuse container placed onto said platform, and means for actuating said arms and for tilting said cradles, whereby containers placed on said platforms and retained by said arms of said cradles are tilted over an adjacent one of said openings in said cylindrical portion of said closure member on continuous rotation thereof.

References Cited in the file of this patent

UNITED STATES PATENTS

| | | |
|---|---|---|
| 647,473 | Bunnell | Apr. 17, 1900 |
| 1,111,846 | Mayer | Sept. 29, 1914 |
| 1,214,976 | Vail | Feb. 6, 1917 |
| 1,780,108 | Barry | Oct. 28, 1930 |
| 1,815,440 | Leipert | July 21, 1931 |

FOREIGN PATENTS

| | | |
|---|---|---|
| 344,240 | France | Aug. 30, 1904 |
| 421,830 | Great Britain | Jan. 1, 1935 |